United States Patent [19]

Lee et al.

[11] Patent Number: 5,928,584
[45] Date of Patent: *Jul. 27, 1999

[54] FOAMABLE COMPOSITIONS FOR ROTATIONAL MOLDING

[75] Inventors: Clifford C. Lee; Donald T. Beuke; Andrew R. Feder, all of Bartlesville, Okla.; John Lefas, Willowdale; Salvatore D'Uva, Brantford, both of Canada

[73] Assignee: Wedtech (USA) Inc., Toronto

[*] Notice: This patent issued on a continued prosecution application filed under 37 CFR 1.53(d), and is subject to the twenty year patent term provisions of 35 U.S.C. 154(a)(2).

[21] Appl. No.: 08/800,783

[22] Filed: Feb. 13, 1997

Related U.S. Application Data

[63] Continuation-in-part of application No. 08/660,706, Jun. 6, 1996, abandoned, and application No. 08/667,438, Jun. 21, 1996, abandoned.

[51] Int. Cl.$^6$ ........................................................ C08J 9/34
[52] U.S. Cl. ........................ 264/45.7; 264/45.5; 264/310; 521/51; 521/142; 521/143; 521/149; 521/137
[58] Field of Search .............................. 521/51, 142, 143, 521/149, 137; 264/45.7, 310, 45.5

[56] References Cited

U.S. PATENT DOCUMENTS

| | | | |
|---|---|---|---|
| 5,366,675 | 11/1994 | Needham | 521/51 |
| 5,783,611 | 7/1998 | Strebel | 521/51 |

*Primary Examiner*—Morton Foelak
*Attorney, Agent, or Firm*—Bacon & Thomas

[57] ABSTRACT

Novel molding compositions consisting essentially of a mixture of a skin-forming component and a foam core-foaming component physically dry-blended together. The skin-forming component comprises two distinct phases blended together, a high zero-shear viscosity material and a low zero-shear viscosity material. The foam core-forming component preferably comprises a foamable polymeric material including a suitable blowing agent. In a preferred embodiment, the three materials are selected from suitable homopolymers and copolymers of ethylene.

26 Claims, No Drawings

FOAMABLE COMPOSITIONS FOR ROTATIONAL MOLDING

CROSS-REFERENCE TO RELATED APPLICATION

This application is a continuation-in-part of patent application Ser. No. 08/660,706 filed on Jun. 6, 1996, now abandoned and entitled, "Novel Foamable Compositions For Rotational Molding", and Ser. No. 08/667,438 filed Jun. 21, 1996, now abandoned and entitled, "Foamable Compositions For Rotational Molding".

FIELD OF THE INVENTION

This invention relates to novel molding compositions for production of foam filled articles of manufacture and the use of such compositions in rotational molding.

BACKGROUND OF THE INVENTION

Rotational molding is generally used to produce a variety of hollow articles of manufacture which are suitable for a variety of applications such as outdoor sports equipment, storage containers and refuse containers. To rotationally mold a part having a desired configuration, a suitable molding resin is introduced into the interior of the rotational mold, which is then closed and rotated about one or two axes inside a heated oven to allow the charged resin to fuse together, forming a hollow article inside the mold. The mold is then removed from the oven to cool. Once cooled the resulting article of manufacture is removed from the mold.

As for specific materials employed as resins in rotational molding, it was indicated in an article appearing in *Modern Plastics* (mid-November 1995) at page D171:

Close to 80% of current rotational molding applications use low-, linear-low-, and high-density polyethylenes as well as crosslinked grades of polyethylene. Ethylene vinyl acetate and adhesive-type polyethylenes are also used in specialized applications. Other resins used are polyvinyl chloride, nylon, polycarbonate, polyesters and polypropylene.

A large variety of commercial rotational molding machines are available in the market to carry out the steps of a rotational molding operation.

In the rotational molding of articles of manufacture, there is often employed a foamable resin, which serves to form a foam that fills the otherwise hollow interior of the molded article. Such foamable resin further serves to reduce part weight, provide a higher insulation value and increased stiffness of the resulting article of manufacture.

Commercial applications are best satisfied by foam-filled plastic articles which exhibit, in addition to sufficient impact strength, a distinct, non-porous outer skin layer. It has long been recognized that articles having a solid skin and a foamed inner layer can be made by rotational molding processes, but to date these have enjoyed little or no commercial success, primarily owing to the fact that the outer skin layer produced often fails to be sufficiently smooth, thick and uniform to meet aesthetic or performance characteristics for different applications.

In the process disclosed in an early patent describing the production of a foamed composite article exhibiting a skin layer, U.S. Pat. No. 3,814,778 (Hosoda, et al.), a mixture is placed in a rotational mold, which comprises two components: (i) a powdered thermoplastic resin, and (ii) a partially crosslinked or crosslinkable granular thermoplastic resin. It is stated in Hosoda that the powdered plastic material tends to adhere to the entire inner surface of the mold to form the surface layer, then the granular plastic, in its turn, adheres to the surface layer.

Similarly, according to Canadian Patent No. 983,226 granted to Du Pont of Canada Limited in 1976, a one-step rotational molding process is used to arrive at articles having a solid skin and a foamed inner layer by using as the molding powder a mixture of "a powdered non-foamable ethylene polymer" and, in pellet form, "a foamable ethylene polymer".

A number of more recent patents provide specific variations on the known technique of combining a foamable resin and a second polymer of smaller particulate size or lower melting point than the first, so that the second polymer ultimately forms a skin layer of the foamed final article, for example, U.S. Pat. Nos. 5,532,282 and 5,366,675 (Needham).

GENERAL DESCRIPTION OF THE INVENTION

We have discovered that substantially improved properties of foamed articles produced by rotational molding, particularly as to the formation of a thick and distinct non-porous skin layer, can be achieved by using a rotomolding charge composition consisting of (i) a skin-forming component which includes, as discrete phases, a high zero-shear viscosity material and a low zero-shear viscosity material, and (ii) a foam core-forming component.

More generally, the single physical parameter best representing the behaviour of polymers and other materials in a rotational molding process is the "zero-shear viscosity", presumably because the predominant force causing polymer melt flow within a rotational mold is simply that of gravity. This force leads to very low shear stresses. At such low shear rates, viscosity measurements of polymeric materials approach a limiting constant value known as the zero-shear viscosity. Operationally, the zero-shear viscosity is herein defined as the viscosity measured at a shear rate of $0.005 \text{ s}^{-1}$ at a temperature of 190° C. This is in contrast to almost all other polymer processing techniques, e.g. injection molding, which typically involve very high shear forces and shear rates.

Throughout the following, the expression "low zero-shear viscosity polymeric material" is intended to refer to polymeric materials exhibiting a zero-shear viscosity of less than 15,000 poise at rotomolding temperatures (190° C.) and at a shear rate of $0.0005 \text{ s}^{-1}$. High zero-shear viscosity polymeric materials include those exhibiting a zero-shear viscosity greater than 20,000 poise under the same conditions of measurement.

We have found it to be essential that the high and low zero-shear viscosity parts of the skin-forming component and the foam core-forming component be separately charged into the rotational mold or, if pre-blended, be dry-mixed so that the respective particles of high and low zero-shear viscosity materials making up the skin-forming component and the particles of the foamable core material not be in any way bound to each other, but free to move independently and to melt differentially during the rotomolding process.

Thus, for example, the high and low zero-shear viscosity parts of the skin-forming component of a rotomolding charge according to the present invention must not be compounded by extrusion blending. It is possible, however, that either or both essential parts of the skin-forming composition be itself a melt-compound of resins, having the desired resulting overall high or low zero-shear viscosity.

In another possible variation, the low zero-shear viscosity part of the skin-forming component can be a crosslinkable polymeric material that exhibits the requisite low zero-shear viscosity when melted but, with the lapse of time and only after the skin layer is formed in the rotomolding process, converts to a thermoset. An example of a crosslinkable polyolefin compound which may be used as the low zero-shear viscosity part of compositions according to the present invention is sold under the tradename SUPERLINK 110 by WedTech Inc.

The high zero-shear viscosity part of the skin-forming component in compositions according to the present invention can, in the most extreme variation, be a material that is actually solid at the molding temperature. Such a substance can be a crosslinked polymer, an inorganic material, non-melting organic material or even a polymer of higher melting temperatures than the typical rotomolding conditions. Although "high viscosity" is not strictly appropriate for materials exhibiting no flow at all, the behaviour of these materials in the system of the present invention is quite similar to that of a very high zero-shear viscosity polymer.

The materials making up the skin-forming component are preferably smaller in particle size than the foam core-forming component, for the same considerations as given in prior art publications such as the Hosoda and Du Pont patents discussed above. Either or both of the high zero-shear viscosity and low zero-shear viscosity parts of the skin-forming component of rotomolding compositions according to the present invention may optionally be formulated with additives advantageous in end-use applications of the molded article, such as antioxidants, UV stabilizers, flame retardants, fillers and pigments.

While applicants intend no limitation to the scope of the invention on the basis of any underlying physical principle, a "bricks-and-mortar" analogy roughly describes the role of zero-shear viscosity in the skin-forming component of compositions according to the invention. The high zero-shear viscosity component ("bricks") lays down along the mold inner surface, where it acts as a partitioning agent ("wall") to keep the foamable component from adhering to the inner skin surface. The low zero-shear viscosity part ("mortar") of the skin-forming component completes the formation of the skin structure by melting and filling gaps in the porous structure formed by the high-viscosity component.

Another way of regarding the underlying process is that the low-viscosity material is the first to deposit (melt) against the mold surface, the high viscosity part of the skin-forming component then "blocking" the particles or pellets of the foamable core-forming component so that they do not attach to the mold wall, where premature blowing/foaming action of this material could mar or thin the skin surface.

The foam core-forming component in compositions according to the present invention may be any particulate matter that will expand in volume by "foaming" when exposed to typical rotomolding temperatures. This volume expansion can be brought about by chemical foaming or blowing agents, which when heated to a specific temperature decompose or react to yield a large volume of gas. Suitable materials may be inorganic such as bicarbonate salts, or organic such as sulfonyl hydrazide or azodicarbonamide, or reactants such as citric acid and soda. Alternatively, volume expansion may arise from other vaporization mechanisms where a liquid imbedded in the foamable matter converts to gas when heated and expands the material, as with popping corn.

For most structural applications it is desirable that the foam core-forming component in compositions according to the present invention exhibit physical properties (especially melt elasticity and zero-shear viscosity) suitable for the formation of a uniform foamed cellular structure under the rotomolding conditions in which the aforementioned skin-forming component forms the outer skin of the molded article. Such materials are well known in the art of rotomolding foamed plastics. Generally, they can include a wide range of pellet-form materials which, when exposed to the rotomolding conditions required to form the skin layer will expand with the individual expanded pellets of the core cohering to each other to enhance structural integrity of the foamed core.

Nevertheless, in some applications where low cost is the primary consideration, foamable natural organic substances (corn, starch, etc.) can be utilized to create an acceptable core. While these materials have lower internal coherence, to the detriment of mechanical properties, they may be suitable in the manufacture of low-cost short-life articles like toys, displays and decorating structures.

The foam core-forming component, too, may be formulated to contain additives intended to improve the properties of the molded final article as required, such as nucleating agents, surfactants, antioxidants, flame-retardants, pigments, fillers, cross-linking agents and monomers.

We have also found that articles of manufacture having enhanced impact strength values, yet maintaining a distinct foam/skin line and smooth non-porous skin can be achieved by adding to compositions of the invention "compatibilizers" which strengthen the ultimate bonding interaction between the high and low zero-shear viscosity components in the formed skin layer. These components are generally immiscible, so that the use of compatibilizers can improve the overall mechanical properties of the product by increasing the strength of the interface between the high and low zero-shear parts of the skin-forming component. Such compatibilizers are well known in the plastics industry and include peroxides and monomers, organosilanes, functionalized copolymers (i.e., with maleic anhydride), acrylic acid or other materials as appropriate, depending on the polymers utilized.

According to a particular embodiment of the invention as described below, an organo cyanurate and an organic peroxide are added to the molding compositions of the invention to function as a compatibilizer.

When the two-part skin-forming component and the foam core-forming component are placed into a mold in a single charge (they may be in physical contact prior to charging) and then subjected to suitable rotational molding conditions, parts are produced having a very distinct skin layer and foamed interior. Some or all of the components can be pre-blended together prior to charging the mold but, again, it must be emphasized that this pre-blending be physical dry-blending and not melt compounding or any other process which might cause attachment or binding between particles of any of the three principal parts of the composition.

SUMMARY OF THE INVENTION

With a view to achieving the above-described advantages and improvements over the prior art, the present invention provides, according to one embodiment thereof, a molding composition for rotational molding which consists essentially of a mixture of:

(i) a skin-forming component, comprising (a) a high zero-shear viscosity material and (b) a low zero-shear viscosity material; and (ii) a foam core-forming component, physically dry-blended together.

As used herein, the term "high zero-shear viscosity" is applicable to a polymeric material having a zero-shear viscosity of greater than 20,000 poise at a temperature of 190° C. and at a shear rate of 0.005/sec. "Low zero-shear viscosity" refers to polymeric materials exhibiting a zero-shear viscosity of less than 15,000 poise at a temperature of 190° C. and at a shear rate of 0.005/sec.

According to a preferred embodiment of the invention, said high zero-shear viscosity material and said low zero-shear viscosity material are selected from homopolymers or copolymers of ethylene, while said foam core-forming component is a foamable polymeric material based on homopolymers or copolymers of ethylene.

According to a further embodiment of the invention, in lieu of the high zero-shear viscosity material in the skin-forming component of the composition, there may be used solid materials which do not melt at any stage of the rotomolding process. In exhibiting no flow at all, such materials might informally be described as having "infinite viscosity" under the rotomolding conditions used.

According to a further embodiment of the invention, a foamable composition for rotational molding may further include a compatibilizing agent for strengthening bonding between said high and low zero-shear viscosity materials. In those compositions within the invention which are particularly based on ethylene polymers and copolymers, the combination of an organic peroxide and an organo cyanurate may be used as the compatibilizing agent, to provide a rotomolded product having additional impact resistance.

DETAILED DESCRIPTION OF THE INVENTION

In carrying out a rotational molding process with compositions of this invention, there is charged to a mold a preblended mixture of the high zero-shear viscosity and low zero-shear viscosity materials along with the foam core-foaming component material. The charged mold is then subjected to rotational molding conditions. Normally there is employed a temperature profile adequate to melt the low zero-shear viscosity component of the charge and affect the foaming process in the foam core-forming component.

Where additional compatibilizing agents such as organic peroxide/organo cyanurate are included in the charge, these are added to the skin-forming components of the base molding composition, as hereinafter described.

Polyethylene Resin Based Compositions

A presently preferred combination of materials for molding compositions according to the present invention uses various homo- and copolymers of ethylene as the principal materials for both parts of the skin-forming component and also for the foam core-forming component.

Thus, a presently preferred material for the high zero-shear viscosity part of the skin-forming component is the HDPE resin available from Phillips Petroleum as Marlex TR-480 (trademark) having a density of 0.943 g/cm$^3$ (ASTM D-1505) and a melt index of 0.13 g/min (ASTM D-1238).

Another material which may be used as the high zero-shear viscosity part of compositions according to the invention and based on polyethylene resins is the LDPE (0.899 g/cm$^3$) available from Exxon as Exact 4042 (trademark) which exhibits a melt index of ~1.1. Chemically, it is a polyethylene copolymer with butene, made using metallocene catalyst technology.

One LDPE resin presently preferred for use as the low zero-shear viscosity part of the skin-forming component is that available from Mobil as LMA-017 (trademark) having a density of 0.918 g/cm$^3$ and a melt index of 26.0. Further examples of PE resins suitable as materials for the low-viscosity part of the skin-forming component are LLDPE copolymers such as LL8556 available from Exxon (ethylene co-polymer with hexene) and 8111 available from Nova Chemicals (ethylene co-polymer with butene).

These and other polyethylene resin-based compositions which may be used in rotomolding compositions according to the present invention are given in Table 1 below.

TABLE 1

EXAMPLES OF SUITABLE LOW VISCOSITY SKIN COMPONENTS

| MATERIAL | MANUFACTURER | ZERO-SHEAR VISCOSITY (poise) | DESCRIPTION |
| --- | --- | --- | --- |
| LMA-017 | MOBIL CHEMICAL | 2640 | LDPE |
| SCLAIR 8111 | NOVA CHEMICALS LTD. | 2480 | LLDPE, butene copolymer |
| ESCORENE LL-8556 | EXXON CHEMICAL | 6600 | LLDPE, hexane copolymer |
| SCLAIR 2114 | NOVA CHEMICALS LTD. | 1060 | LLDPE, butene copolymer |
| SCLAIR 2316 | NOVA CHEMICALS LTD. | 735 | LLDPE, butene copolymer |
| SCLAIR 79F | NOVA CHEMICALS LTD. | 1540 | HDPE homopolymer |

EXAMPLES OF SUITABLE HIGH VISCOSITY COMPONENTS

| MATERIAL | MANUFACTURER | ZERO-SHEAR VISCOSITY | DESCRIPTION |
| --- | --- | --- | --- |
| MARLEX TR480 | PHILLIPS PETROLEUM | ~660000 | HDPE |

TABLE 1-continued

| EXACT 4042 | EXXON CHEMICAL | 22000 | LLDPE, butene copolymer (metallocene) |
|---|---|---|---|

One foamable ethylene polymer presently preferred for use in the foam core-forming component of compositions according to the present invention is based on the MDPE resin available from Novacor as Novapol TD-7902u (trademark) having a density of 0.938 g/cm$^3$ (ASTM D-792) and a melt index of 3.5 (ASTM D-1238 condition 190/2.16), to which a suitable foaming agent has been added.

When using a mold having the dimensions of 2"×12"×24" there is typically used a charge of about 1200 grams of a preblend of the high-viscosity polyethylene resin and the low-viscosity polyethylene resin, and about 1175 grams of the foamable polyethylene resin. The latter is an ethylene-based polymer which includes a suitable foaming agent incorporated therein. Methods of foaming polyethylenes in rotational molding are well known. Examples of preferred chemical blowing agents are sodium bicarbonate, p,p'-oxybis (benzenesulfonyl hydrazine) and azodicarbonamide.

According to a particular embodiment of the invention, there may also be added to the skin forming components of the base molding composition an organic peroxide and an organo cyanurate, which jointly act as a compatibilizing agent to increase the strength of the bond between the high and low zero-shear viscosity parts of the skin-forming component.

The term "organic peroxide" as used herein is intended to mean an organic peroxide selected from the group consisting of dicumyl peroxide, 2,5-dimethyl-2,5-di-t-butyl peroxy hexane, di-t-butyl peroxide, and 2,4-dimethyl-2,4-peroxy-t-butyl-hexyne available from Atochem as Lupersol 130 (L-130) (trademark). The presently preferred organo cyanurate is triallyl cyanurate (TAC) available from Cytec Inc. Addition of the organic peroxide and TAC to the skin-forming component of the base molding composition may readily be achieved by the addition of those additives to the powdered resin concentrate as described in Example 2 below.

TAC is preferably employed in an amount in the range of from 0.01 to 1.0 weight percent of the total molding compound. The organic peroxide is preferably employed in an amount in the range from about 0.01 to 1.0 weight percent of the total molding compound.

In preparing the mold charge in accordance with the preferred embodiment of the present invention, the high zero-shear viscosity polyethylene resin and the low zero-shear viscosity polyethylene resin are each ground to a particle size of about 20–50, preferably 35 mesh, and then pre-blended before introduction into the mold along with the foamable resin constituent, which is preferably in the form of foamable pellets. As emphasized above, it is essential that pre-blending be a physical dry mixing process and that the three resin components of the pre-blend be distinct phases.

According to this preferred embodiment, the ratio of high zero-shear viscosity PE to low zero-shear viscosity PE can be in the range of from about 80:20 to about 20:80, but the optimum composition of the mixture will depend on the end product and the amount added to the charge will depend on the surface area of the part and the desired wall thickness. The foamable polyethylene resin which will form the core is added to the charge in an amount depending on the volume of the rotomolded article.

It is a feature of the present invention that the molded article have an essentially solid skin. During the molding process, the skin is formed from the powder blend of the high zero-shear viscosity and low zero-shear viscosity parts of the skin-forming components prior to the foaming of the foamable core charge component. The time and temperature employed will be dependent upon such factors as the thickness of the part to be rotomolded, the specific heat of constituents and the conditions needed to effect foaming of the foamable PE component of the mold charge.

The following examples are presented to further illustrate the present invention:

EXAMPLE 1

(i) Preparation of Skin-forming Component:

(A) 83.5 Kg of polyethylene resin was reduced to 20 mesh using a UR-12 Wedco grinder.

(B) A 50 Kg concentrate (lot) using the grind of (A) was prepared by blending in a drum blender for 30 minutes a mixture consisting of the following:

| | |
|---|---|
| Polyethylene Resin | 47.63% |
| Pigment - Blue[1] | 0.07% |
| Pigment - Black[2] | 11.5% |
| Titanium Dioxide | 15.8% |
| UV Absorber[3] | 5.0% |
| UV Stabilizer[4] | 15.0% |
| Antioxidant[5] | 5.0% |

[1]Hoechst PV Fast A2R
[2]Harshaw 9895 Black
[3]Cytec UV530 - benzophenone
[4]Cytec UV3346 - hindered amine
[5]Ciba-Geigy Irganox B-900 - hindered phenol/phosphite blend (C) Following blending, the resulting blend was pelletized in a Werner Pfleiderer ZSK-30 extruder.

(D) 20 Kg of the resulting pelletized blend of (C) was then let down to 1000 Kg with a HDPE resin having a density of 0.943 and a melt index of 0.13 (currently available from Phillips Petroleum Company as Marlex TR-480). The resulting mixture was then ground to 35 mesh using a UR12 Wedco grinder, to produce the high zero-shear viscosity part of the skin-forming component.

(E) 15 Kg of the pelletized blend of (C) was let down to 750 Kg with 735 Kg of a low density polyethylene (LDPE) having a density of 0.918 and a melt index of 26. The resulting blend was then ground to 35 mesh using a UR12 Wedco grinder, to produce the low zero-shear viscosity part of the skin-forming component.

(F) 120 Kg of the grind of (D) and 80 Kg of the grind of (E) were blended in a Ribbon Blender for 30 minutes to provide 200 Kg of a blended product suitable for use as charge to a rotational mold.

(ii) Preparation of Foam Charge:

5200 Kg of foamable pellets were prepared in a Werner-Pfleiderer ZSK-70 extruder in accordance with the following formulation:

| | |
|---|---|
| 3% | Sodium Bicarbonate |
| 0.6% | Stearamide (surfactant)[1] |
| 96.40% | Linear Medium Density Polyethylene[2] |

[1]Witco Kemamide S
[2]a polyethylene/hexene[1] copolymer having a melt index of 3.5 and a density of 0.938 (currently available from Novacor as Novapol TD-7902u). Prior to pelletizing this MDPE resin was ground to a 35 mesh using a UR-12 Wedco grinder.

(iii) Preblending and Rotomolding:

A charge of 1200 grams of the blend of step (i) above and 1175 grams of the foamable product of step (ii) was formed by admixing and therefore introduced into a stainless steel flat test mold of the dimensions 2"×12"×24". Molding was carried out using the following conditions on a McNeil rotomolder:

| | |
|---|---|
| Oven Temperature | 650–700° F. |
| Dwell Time | 15 min. |
| Fan Time | 15 min. |
| Water Spray Time | 10 min. |
| Major Axis Rotation Speed | 4 RPM |
| Minor Axis Rotation Speed | 16 RPM |

These conditions are provided as illustrative of suitable molding conditions. As such ultimate molding conditions can vary with mold configuration and composition of the charge materials.

(iv) Results:

Following removal of the molded article as produced by the Process of step (iii), the resulting molded article was found to have the following characteristics:

Skin Layer—Distinct (uniform ⅛" thickness)

Porosity—None in Skin Layer

In addition, the article had an impact strength of 42 ft-lb at room temperature as measured on a Standard Arm Impact Tester at room temperature using a 20 pound dart (ARM— Association of Rotational Molders). This is a modified ARM impact test. The standard ARM impact tests typically run at −40° F.

To illustrate the effects of the individual components of the molding composition of the present invention, a series of moldings were prepared in the manner of Example 1(iii) above, using charges to the mold as noted.

The results are presented in Table 2.

TABLE 2

Effects of Molding Compositions on Appearance and Impact Properties

| Rotomolding Composition | Distinction of Layer | Surface | Room Temp. ARM Impact Properties |
|---|---|---|---|
| TR480 Skin | N.A. | Porous | <10 ft-lb |
| LMA-017 Skin | N.A. | Smooth | 26 ft-lb |
| Physical mixing of TR480 (60%) and LMA-017 (40%) as skin | N.A. | Porous | <10 ft-lb |
| TR480 and foamable pellets containing 3% NaHCO₃ | Yes | Very rough and porous | 53 ft-lb |
| LMA-017 and foamable pellets containing 3% NaHCO₃ | No | Very rough and cellular | <10 ft-lb |

TABLE 2-continued

Effects of Molding Compositions on Appearance and Impact Properties

| Rotomolding Composition | Distinction of Layer | Surface | Room Temp. ARM Impact Properties |
|---|---|---|---|
| TR480 mixed with LMA-017 (60:40 wt. ratio) and foamable pellets | Yes | Smooth | 42 ft-lb |

The foregoing data clearly demonstrates that mixtures of high zero-shear viscosity PE and low zero-shear viscosity PE can be employed in the compositions of the present invention to provide molded articles of manufacture having good impact values, smooth surfaces and distinct skin layers. In addition, when there is utilized a blend in accordance with the presently preferred embodiment of this invention (wherein the ratio of high to low zero-shear viscosity PE is 60:40 there is achieved a useful article of manufacture having an impact strength of 42 ft-lb and uniform wall thickness of ⅛.

EXAMPLE 2

This example illustrates the addition of an organo cyanurate and an organic peroxide to a molding composition according to the embodiment represented in Example 1, to permit production of articles of manufacture exhibiting very high impact strength values while maintaining a distinct foam/skin line and having a smooth and non-porous skin.

According to the present example, both parts of the skin-forming component and a foam charge were prepared as in steps (i) and (ii) of Example 1 above.

The organo cyanurate component was introduced by mixing 60 grams of triallyl cyanurate with 5940 grams of the skin-forming composition. The resulting mixture was subjected to high-speed mixing in a Welex blender to give 6,000 grams of a 1% TAC concentrate. An organo peroxide concentrate was prepared by blending 60 grams of 2,4-dimethyl-2,4-peroxy-t-butyl-hexyne (L-130) with 5940 grams of the same skin-forming composition to give a 1% L-130 concentrate.

Table 3 below shows the results of three separate rotomolding runs:

In the first run, 465 grams of the 1% TAC concentrate and 24 grams of the L-130 concentrate prepared as above were admixed with 711 grams of the skin-forming composition. The resulting 1200 grams of blend was charged with 1175 grams of the foamable pellets into a 2"×12"×24" stainless steel flat test mold.

In the second run, 195 grams of the 1% TAC concentrate and 24 grams of the L-130 concentrate were admixed with 981 grams of the skin-forming composition. The resulting 1200 grams of blend was charged with 1175 grams of the foamable pellets into the same stainless steel flat test mold.

The third (control) run was prepared in the same manner as runs 1 and 2, with the exception that the TAC and L-130 were omitted from the skin-forming charge. Thus, 1200 grams of a 60:40 blend free of TAC and L-130 were charged with 1175 grams of the foamable pellets into the stainless steel flat test mold.

In all three runs, molding was carried out using the following conditions in a McNeil rotomolder:

| | |
|---|---|
| Oven Temperature | 650–700° F. |
| Dwell Time | 15 min. |
| Fan Time | 15 min. |
| Water Spray Time | 10 min. |
| Major Axis Rotation Speed | 4 RPM |
| Minor Axis Rotation Speed | 16 RPM |

The results are set out in Table 3 below. The molded articles from Runs 1 and 2, employing the added cyanurate and peroxide in the skin-forming component of the charge exhibit slightly better impact resistance and significantly improved tensile break properties compared with the control. Particular applications where this would be advantageous are, for example, chemical storage containers, industrial pallets and automotive parts.

TABLE 3

| Run | Wt. % TAC | Wt. % Peroxide | Distinct Layer | Surface | Impact Ft/lb | Tensile[1] Yield | Tensile[1] Break | Elongation[1] % |
|---|---|---|---|---|---|---|---|---|
| 1 | 0.3875 | 0.020 | Yes | Smooth | 46 | 2228 | 1129 | 75 |
| 2 | 0.1625 | 0.020 | Yes | Smooth | 45 | 2264 | 1053 | 76 |
| 3 (Control) | 0 | 0 | Yes | Smooth | 42 | 2342 | 624.8 | 66 |

[1]ASTN D-638

EXAMPLE 3

In the experimental results constituting this example, rotomolding compositions were used according to the present invention, with the same high zero-shear viscosity component (Marlex TR480) and with the same foaming resin core component based on Novapol TD-7902u as in Examples 1 and 2. However, the low zero-shear viscosity part of the skin-forming component of the composition (namely, the LDPE designated LMA-017) was replaced by an LLDPE co-polymer exhibiting a low zero-shear viscosity. Table 1 above gives the measured zero-shear viscosity for six different low zero-shear viscosity polyethylene-based resins which can be used in the skin-forming component of a rotomolding composition according to the invention when physically dry-blended with a suitable high-viscosity resin.

The procedure carried out whose results are given in Table 5 below were as follows:
(i) Preparation of Skin-forming Component
(A) A 50 Kg "color concentrate" was prepared by tumble-blending for twenty minutes in a drum, and then melt compounding on a Werner and Pfleiderer ZSK30 twin screw extruder the following recipe for a concentrate designated "Rotolite GC02". Rotolite GC02 concentrate is an intermediate product made solely for colorizing and stabilizing the resin. For this purpose, it is added as a minor component to each of the low-viscosity and high-viscosity phases as discussed in (B) and (C), respectively, below.
Formulation ID: Rotolite GC02

| | |
|---|---|
| Polyethylene | 54% |
| Carbon Black (1) | 1% |
| Titanium Dioxide (2) | 20% |
| Antioxidant (3) | 5% |
| UV absorber (4) | 5% |
| UV stabilizer (5) | 15% |

1. Columbian Chemicals Co., #14 black
2. Dupont Inc., R104
3. Ciba Geigy, Irganox B900, hindered phenol/phosphite blend
4. Cytec Industries, UV531, benzophenone
5. Cytec Industries, UV3346, hindered amine (B) 4 Kg of the Rotolite GC02 was let down at 2% with the low zero-shear viscosity 8111 resin. That mixture was tumble-blended for ten minutes and melt compounded on the ZSK30 extruder. The compound was then ground to 35 mesh on a Wedco grinder and labelled as the low-viscosity part of the skin-forming component.

(C) 4 Kg of the Rotolite GC02 was let down at 2% with the high zero-shear viscosity TR480 resin. The mixture was tumble-blended for ten minutes and melt-compounded on the ZSK30 extruder. The compound was then ground to 35 mesh on a Wedco grinder and labelled as the high zero-shear viscosity part of the skin-forming component. As shown in the second and third columns of Table 5, various ratios of the low zero-shear viscosity part produced in step (B) above and the high zero-shear viscosity part prepared in step (C) above were hand-blended prior to charging the rotational mold.
(ii) Preparation of Foam Charge
200 Kg of foamable pellets were produced as follows:

| | |
|---|---|
| TD7902 | 96.25% |
| Sodium Bicarbonate | 3.0% |
| Stearamide (1) | 0.6% |
| Antioxidant (2) | 0.1% |
| Carbon Black (3) | 0.05% |

(1) Witco Inc., Kemamide S
(2) Ciba Geigy, Irganox B900, hindered phenol/phosphite blend
(3) Columbian Chemicals Co., #14 black The foamable polyethylene resin based on TD7902 was ground on a Wedco grinder to 20 mesh and tumble blended for fifteen minutes in the above-formulation, then melt-compounded on a ZSK30 extruder to produce the foam core-forming component of the rotomolding composition.
(iii) Preblending and Rotomolding
A charge of 1200 grams total weight of a blend of the low zero-shear viscosity component ("8111%") and the high zero-shear viscosity component powders ("TR480%") were placed into the mold along with 1175 grams of the above-described foamable formulation. Molding was carried out in all of the runs of Table 5 under the molding conditions given in Table 4 below:

TABLE 4

| CYCLE | TYPE | TIME (min) | OUTER AXIS RPM | INNER AXIS RPM |
|---|---|---|---|---|
| 1:OVEN | 750F | 14 | 18 | 6 |
| 2:OVEN | 650F | 5 | 6 | 3.3 |
| 1:COOL | DWELL | 17 | 6 | 3.3 |

TABLE 4-continued

| CYCLE | TYPE | TIME (min) | OUTER AXIS RPM | INNER AXIS RPM |
|---|---|---|---|---|
| 2:COOL | WATER | 12 | 6 | 3.3 |
| 3:COOL | FAN | 15 | 6 | 3.3 |

Eight molding trial results are listed in Table 5.

TABLE 5

Molding Trial Results

| RUN # | TR480% | 8111% | DISTINCT LAYER | POROSITY (SKIN) | FOAMED INTERIOR | IMPACT (1) ft-lb | IMPACT (2) ft-lb |
|---|---|---|---|---|---|---|---|
| 1 | 80 | 20 | yes | yes (on corners) | good | 45 | >115 (3) |
| 2 | 70 | 30 | yes | no | good | 26 | >115 (3) |
| 3 | 60 | 40 | yes | no | good | 19 | 115 |
| 4 | 50 | 50 | yes | no | good | 21 | 114 |
| 5 | 40 | 60 | yes | no | good | 13 | 104 |
| 6 | 30 | 70 | yes but less uniform with thin areas | no | good | 11 | 88 |
| 7 | 60 | LMA017 40 | yes | no | good | 0 | 87 |

(1) SINGLE LAYER SKIN PENETRATION IMPACT OF 2" FOAM SYSTEM @ −40C
(2) DOUBLE LAYER SKIN PENETRATION IMPACT OF 2" FOAM SYSTEM @ −40C
(3) MAXIMUM HEIGHT WITH 10 lb WEIGHT

In Runs 1 to 6, the foam core-forming component (TD7902) and the chemical foaming agent were as in Examples 1 and 2. The high zero-shear viscosity part (TR480) of the skin-forming component was also the same as in the first two Examples. However, the low zero-shear viscosity part LMA017 of the skin-forming component in the earlier examples was replaced by an LLDPE co-polymer having an equivalent low zero-shear viscosity, the aforementioned 8111 LLDPE resin. By way of comparison, Run 7 of Table 4 shows the measured properties of an article rotomolded from a charge according to the present invention, in which the skin-forming component was 60% of the low zero-shear viscosity TR480 resin and 40% of LMA-017, as in Example 1.

The results illustrate that a thick distinct skin layer can be achieved using different resin materials in the skin-forming component, provided that it consists essentially of a high zero-shear viscosity and a low zero-shear viscosity component.

EXAMPLE 4

A run was carried out under the conditions of Run 3 of Table 5, but with the high zero-shear viscosity component (HDPE TR480) replaced by Exact 4042, a high zero-shear viscosity, yet low density, ethylene/butene co-polymer described above with the other polyethylene-resin based compositions and may be used according to the preferred combination of materials for molding compositions according to the present invention. This comparative run also resulted in a thick distinct skin layer and in an article having comparable impact strength to those produced in Runs 1 to 6 of Table 5.

Other Materials for Skin-Forming Component of Rotomolding Compositions

Provided that the high and low zero-shear viscosity parts of the skin-forming component and the foam core-forming component are physically discrete so that these materials are free to move independently and to melt differentially during the rotomolding process, a very wide range of materials may be used as components of rotomolding compositions within the scope of the present invention, affording a wide range of applications. Some of these were referred to in the General Description of the Invention above and the following are specific examples:

EXAMPLE 5

Use of Alternative Core-forming Materials

A run was carried out under the conditions of Run 4 of Table 5, but the foam core-forming component was replaced by popping corn, as an example of inexpensive, organic core-forming material. This comparative run also resulted in a thick distinct skin layer with a popcorn foam-filled interior. However, there was no "bonding" or sintering of the foam core to the skin layer which results in lower comparable impact strength to those produced in runs 1 to 6 of Table 5.

EXAMPLE 6

Use of Crosslinkable Materials in Skin-forming Component

In this variation of the experiments, a run was carried out under the conditions of Run 3 of Table 5, but the low zero-shear viscosity component was replaced with SUPER-LINK 110 (trade-mark) made by WedTech Inc. This material is a crosslinkable HDPE material which when initially melted has a low zero-shear viscosity but by the end of the rotomolding cycle (Table 4) converts to a thermoset after the skin is formed. The part produced had a distinct skin layer with a foamed core. The resulting impact values as compared to Run 3 in Table 5 were: Impact (1)=39 ft-lbs and Impact (2)=130 ft-lbs. This is significant improvement vs. Run 3 of Table 5.

EXAMPLE 7

Use of Alternative High Zero-shear Materials in Skin-forming Component

In place of high zero-shear viscosity polymeric materials such as the polyethylene resins of previous Examples, non-melting organic or inorganic materials may be used in the skin-forming component. Thus, a run was carried out under conditions of Run 3 of Table 5, but with the high zero-shear viscosity component was replaced by −30 mesh ground recycled automotive tire rubber. The resulting molded article had a distinct skin layer with a foamed core.

While a preferred embodiment has been described in detail and examples have been given for the purpose of illustrating the present invention, the invention may be carried out with various modifications without departing from the spirit or essential attributes thereof and, accordingly, reference should be made to the appended claims as defining the scope of the invention.

We claim:

1. A foamable mixture for rotational molding of an article, said mixture consisting essentially of discrete particles of high zero-shear viscosity polymeric material, discrete particles of low zero-shear viscosity polymeric material and discrete particles of foamable core forming component; with the proviso that said discrete particles of high zero-shear viscosity polymeric material and said discrete particles of low zero-shear viscosity polymeric material have substantially the same particle size distribution.

2. A composition according to claim 1, wherein said low zero-shear viscosity polymeric material is a crosslinkable material which exhibits suitable low zero-shear viscosity during the skin-forming stage in the rotomolding of said composition, but which gels or sets at a later point in the rotomolding process after said high and low zero-shear viscosity polymeric materials have formed the skin of the molded article.

3. A composition according to claim 2, wherein said crosslinkable material is SUPERLINK 110.

4. A composition according to claim 1, wherein said high zero-shear viscosity polymeric material is an organic material which does not melt under rotomolding conditions.

5. A composition according to claim 4, wherein said high zero-shear viscosity polymeric material is ground recycled automotive tire rubber.

6. A composition according to claim 1, wherein said foamable core-forming component comprises a foamable polymeric material.

7. A composition according to claim 6, wherein each of said high zero-shear viscosity material, said low zero-shear viscosity material and said foamable material is selected from the group consisting of homopolymers and copolymers of ethylene.

8. A composition according to claim 7, wherein said foamable material comprises a medium density polyethylene resin and a suitable foaming agent.

9. A composition according to claim 6, wherein said high zero-shear viscosity material is a high density polyethylene resin and said low zero-shear viscosity material is a low density polyethylene resin.

10. A composition according to claim 1, wherein the weight percent ratio of said high zero-shear viscosity material to said low zero-shear viscosity material in said skin-forming component is from 80:20 to 20:80.

11. A composition according to claim 1, further comprising a compatibilizer material for increasing the bonding between said high zero-shear viscosity polymeric material and said low zero-shear viscosity polymeric material.

12. A composition according to claim 8, further comprising a compatibilizing material for increasing the bonding between said high density polyethylene resin and said low density polyethylene resin in forming the skin of said article.

13. A composition according to claim 12, wherein said compatilizing material comprises an organic peroxide and an organo cyanurate.

14. A composition according to claim 13, wherein said organic peroxide is selected from the group consisting of dicumyl peroxide, 2,5-dimethyl-2,5-di-t-butyl peroxy hexane, di-t-butyl peroxide, and 2,4-dimethyl-2,4-peroxy-t-butyl-hexyne and said organo cyanurate is selected from the group consisting of triallyl cyanurate and triisoallyl cyanurate.

15. The foamable mixture of claim 1 wherein said discrete particles of high zero-shear viscosity polymeric material remain solid under the rotational molding conditions to which the composition is subjected in molding the article.

16. A composition according to claim 15, wherein said low zero-shear viscosity material and said foam core-forming component are selected from the group consisting of homopolymers and copolymers of ethylene.

17. A composition according to claim 16, wherein said material which remains solid under rotomolding conditions is ground recycled automotive tire rubber.

18. The composition of claim 1 wherein said discrete particles of high zero-shear viscosity polymeric material and said discrete particles of low zero-shear viscosity polymeric material are in the form of a powder wherein the particles have a size of 20–50 mesh and said foamable core forming component is a foamable polymer in the form of pellets.

19. The composition of claim 18 wherein said discrete particles of high zero-shear viscosity polymeric material and said discrete particles of low zero-shear viscosity polymeric material have a particle size of 35 mesh.

20. A foamable mixture for rotational molding of an article, said mixture consisting essentially of discrete particles of high zero-shear viscosity polymeric material, discrete particles of low zero-shear viscosity polymeric material in an amount which is equal to or more than the amount of said discrete particles of high zero-shear viscosity polymeric material, and discrete particles of a foamable core forming component.

21. A foamable mixture for rotational molding of an article, said mixture consisting essentially of discrete particles of a high zero-shear viscosity polymeric material, discrete particles of a low zero-shear viscosity polymeric material and discrete particles of a foamable natural organic substance.

22. A foamable mixture for rotational molding of an article, said mixture consisting essentially of discrete particles of recycled automotive rubber, discrete particles of low zero-shear viscosity polymeric material and discrete particles of foamable core forming component.

23. A method for producing a foam-filled article having a non-porous skin layer, comprising the steps of:
 (a) preparing a foamable mixture consisting essentially of
  (i) a high zero-shear viscosity polymeric material in particulate form;
  (ii) a low zero-shear viscosity polymeric material in particulate form; and
  (iii) a foamable core-forming material in particulate form,
 wherein the particles of said components (i), (ii) and (iii) are mutually discrete, and said discrete particles of high zero-shear polymeric material and said discrete particles of low zero-shear viscosity polymeric material have substantially the same particle size distribution,
 (b) rotomolding said foamable mixture under suitable conditions to produce an article having a distinct skin layer and foamed interior.

24. A method according to claim 23, wherein said low zero-shear viscosity polymeric material is a cross-linkable material which exhibits suitable low zero-shear viscosity during the skin-forming stage in the rotomolding of said composition, but which gels or sets at a later point in the rotomolding process after said high and low zero-shear viscosity polymeric materials have formed the skin of the molded article.

25. A method according to claim 23, wherein said foamable core-forming component comprises a foamable polymeric material.

26. A method according to claim 23, wherein said discrete particles of high zero-shear viscosity polymeric material remains solid under the rotational molding conditions to which the composition is subjected in molding the article.

* * * * *